April 5, 1966  S. L. SMITH  3,244,792
WATER COOLED CONNECTING CABLE FOR SPOT WELDING MACHINES
Original Filed April 6, 1962  2 Sheets-Sheet 1
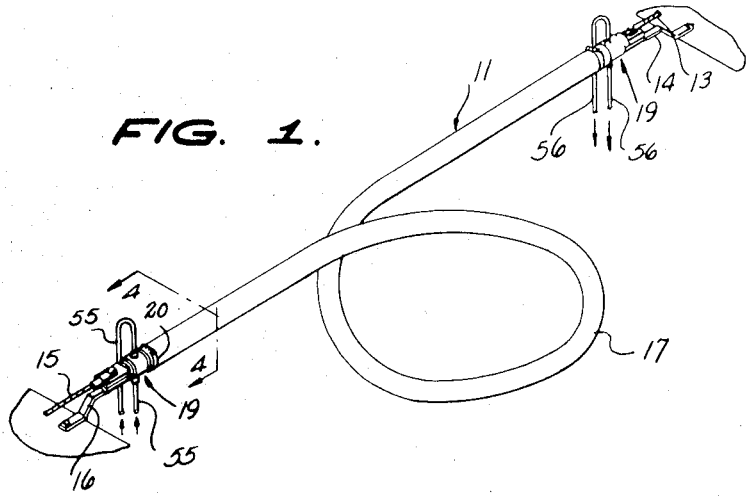
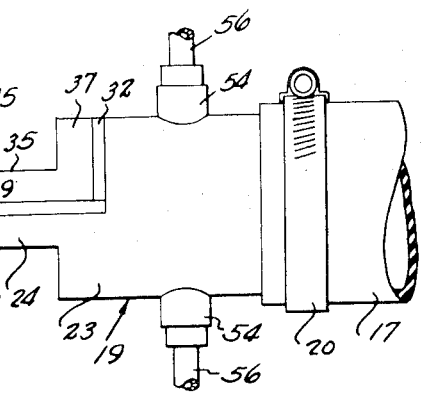
INVENTOR.
SAMUEL L. SMITH,
BY
Harness, Dickey & Pierce
ATTORNEYS.

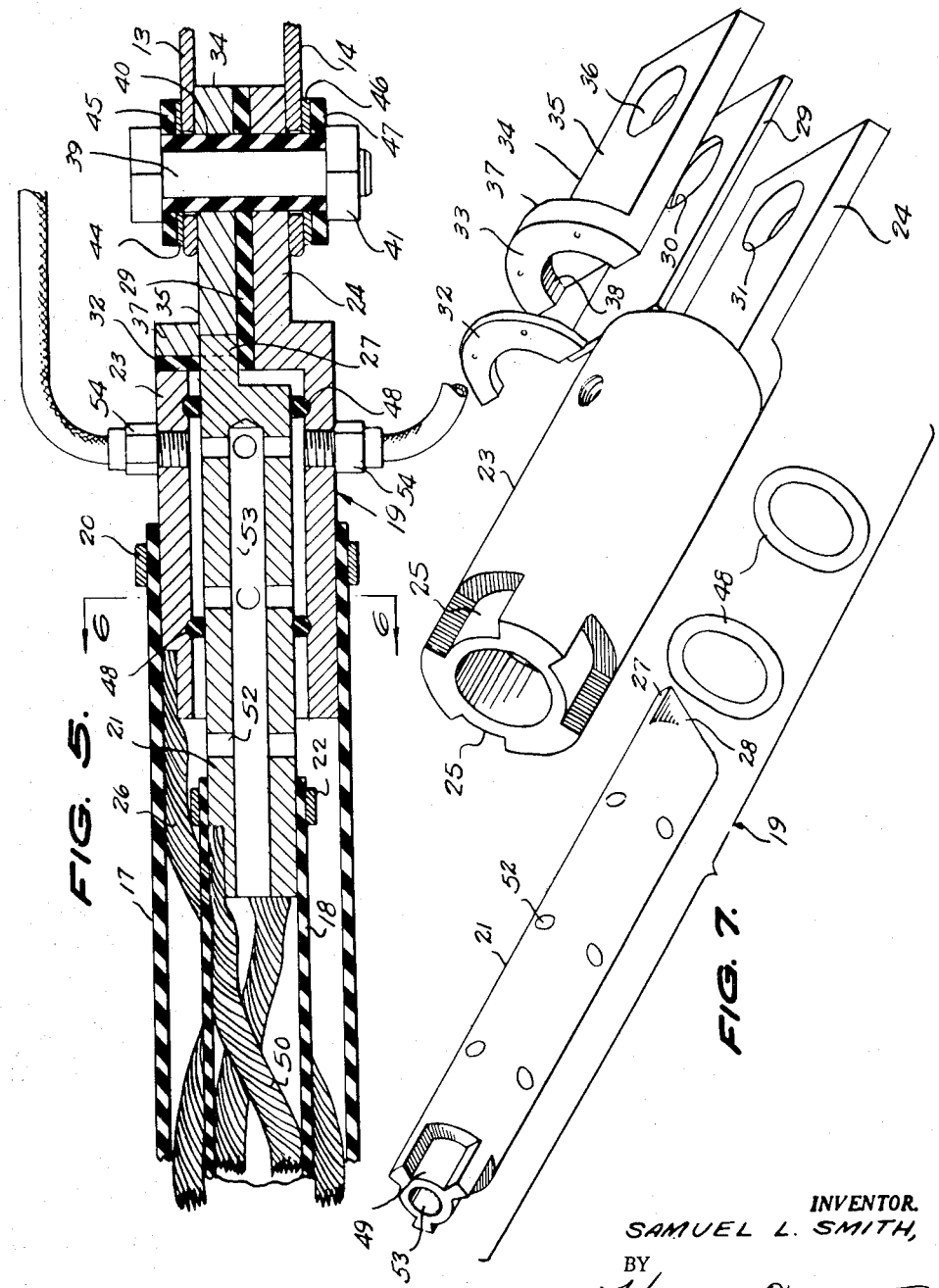

United States Patent Office 3,244,792
Patented Apr. 5, 1966

3,244,792
WATER COOLED CONNECTING CABLE FOR SPOT WELDING MACHINES
Samuel Lawton Smith, Ypsilanti, Mich., assignor to Gar Wood Industries, Inc., a corporation of Michigan
Continuation of application Ser. No. 185,682, Apr. 6, 1962. This application July 8, 1963, Ser. No. 293,404
5 Claims. (Cl. 174—19)

This application is a continuation of application Serial No. 185,682, filed April 6, 1962, by Samuel L. Smith, which application is now abandoned.

This invention relates to high current-carrying cable devices, and more particularly to a water-cooled flexible cable assembly especially suitable for use with spot welding machines, for example, for conducting welding current to the electrodes of a spot welding machine.

A main object of the invention is to provide a novel and improved water-cooled cable assembly for use in conducting large quantities of current, for example, in a spot welding machine, the cable assembly being relatively simple in construction, providing efficient temperature control therein so that the insulation thereof will not be damaged when hugh current passes therethrough, and being arranged so that magnetic forces developed by the current are substantially neutralized so that the cable assembly will be maintained substantially free of mechanical stresses when large quantities of current pass therethrough under operating conditions.

A still further object of the invention is to provide an improved water-cooled cable assembly for use in connecting portions of high current equipment, such as portions of a spot welding apparatus, the cable assembly being easy to install, being durable in construction, being flexible so that it is adjustable in accordance with variations in distance between the elements connected thereby, and being relatively inexpensive to fabricate.

Further objects and advantages of the invention will become apparent from the following description and claims, and from the accompanying drawings, wherein:

FIGURE 1 is a perspective view showing an improved water-cooled cable assembly according to the present invention connected between a pair of spaced portions of an apparatus utilizing same.

FIGURE 2 is an enlarged transverse vertical cross sectional view taken substantially adjacent one end of the assembly of FIGURE 1, and substantially on the line 2—2 of FIGURE 3.

FIGURE 3 is a fragmentary side elevational view of one end portion of the cable assembly of FIGURE 1 to an enlarged scale.

FIGURE 4 is an enlarged transverse vertical cross sectional view taken substantially on the line 4—4 of FIGURE 1.

FIGURE 5 is a longitudinal vertical cross sectional view taken substantially on the line 5—5 of FIGURE 2.

FIGURE 6 is a transverse vertical cross sectional view taken on the line 6—6 of FIGURE 5.

FIGURE 7 is a perspective view of the components of one of the terminal assemblies employed in the cable of FIGURES 1 to 6, said components being shown in separated positions.

Referring to the drawings, 11 generally designates an improved water-cooled two-conductor cable constructed in accordance with the present invention and adapted to carry relatively heavy current between a first pair of conductors 13 and 14 and a second pair of conductors 15 and 16, or vice versa, for example, in carrying welding current to the electrodes of a spot welding machine.

The cable 11 comprises a pair of concentric flexible conduits 17 and 18 of rubber or similar resilient deformable material, the larger conduit 17 being clampingly secured at its opposite ends to respective terminal members 19, 19 by respective conventional hose-clamping bands 20, 20 and the inner conduit 18 being similarly secured on the inner end portions of core members 21 by similar conduit-clamping bands 22, as shown in FIGURE 5.

The terminal assemblies 19 are of identical construction, each comprising a generally cylindrical outer shell portion 23 of copper, or similar highly conductive, non-corrosive metal, the cylindrical shell member 23 being provided at its outer end with a flat apertured lug portion 24. The inner end of the shell member 23 is formed with a plurality of uniformly spaced arcuate peripheral recesses 25 in which the ends of respective heavy braided conductor strands 26 are adapted to be received and to be suitably secured, as by brazing, or the like. The core member 21 is hollow and is substantially cylindrical in shape, being substantially longer than the inner cavity of the outer shell member 23, so that the inner end portion can project a substantial distance inwardly so as to receive the end of the inner flexible conduit member 18 thereon in the manner illustrated in FIGURE 5. The outer end of each core member 21 is formed with a lug portion 27 of generally semicircular cross section having a flattened bottom surface 28. The lug portion 27 is disposed so that its bottom surface 28 is substantially parallel to the flattened lug 24 of the outer shell member 23, as illustrated in FIGURE 5, a plate member 29 of suitable resilient deformable insulating material, such as rubber, or the like, being interposed between the surface 28 and the flat plate-like lug 24. The resilient insulating plate 29 is formed with an aperture 30 which is registrable with the aperture 31 of the plate-like lug 24. A generally semicircular flat gasket member 32 of rubber, or other suitable resilient deformable insulating material is disposed on the top portion of the lug 27, being interposed between the end of the shell member 23 and the face 33 of a clamping lug 34 which is secured on the insulating plate member 29. The member 34 comprises a flat plate-like portion 35 having an aperture 36 registrable with the apertures 30 and 31, and with the generally semicircular rib 37 having the flat face 33 and having a generally semicylindrical recess 38 adapted to receive and conductively engage the end portion of the lug member 27. Thus, as shown in FIGURE 5, the end of the lug 27 is received in the correspondingly shaped recess 38 and is held in conductive engagement therewith by a clamping bolt 39 which extends through a resilient insulating sleeve 40, said insulating sleeve 40 being disposed in the registering apertures 36, 30 and 31. A clamping nut 41 is provided on the end of the bolt 39, as shown in FIGURE 5. One of the line terminals to be connected to the cable is conductively clamped to the lug 37, for example, the line conductor 13 is engaged around and clamped to the flat plate-like portion 35, as by means of a bearing washer 44 surrounding the sleeve 40 and an insulating washer 45 surrounding said sleeve and disposed between the bearing washer 44 and the head of bolt 39. The other line conductor 14 is similarly clamped against the bottom surface of the flat lug member 24 in a similar manner, the conductor 14 engaging around the sleeve 40 and being clamped against member 24 by a metal bearing washer 46 and an insulating washer 47, the washer 47 being disposed between the bearing washer 46 and the nut 41.

Resilient deformable spacer rings 48, 48 are provided between the cylindrical outer shell member 23 and the hollow cylindrical core member 21, as shown in FIGURE 5, the rings 48 being made of suitable resilient deformable material, such as rubber, or the like, and serving to maintain the core member 21 substantially centered in the outer shell 23.

The core member 21 is formed at its inner end with a plurality of uniformly spaced arcuate recesses 49 receiving the ends of the stranded conductor wires 50, said ends being suitably secured in the recesses 49, as by brazing, or the like.

The stranded conductors 26 are spirally wound around the flexible tubular inlet conduit 18, and the stranded conductors 50 are similarly spirally wound around each other inside the inner tubular conductor 18, the conductors being arranged so that the magnetic forces produced thereby balance each other, so that such forces are substantially neutralized.

The tubular inner core members 21 are provided with a plurality of radial apertures 52 establishing communication between the inner bore 53 thereof and the space outwardly adjacent thereto. Conduit fittings 54 are connected to the outer portions of the shell member 19, to establish communication with a fluid cooling circuit. Thus, as shown in FIGURE 1, cold water supply conduits 55, 55 are connected to the conduit connectors 54 of the terminal assembly 19 at one end of the cable and outlet conduits 56, 56 are connected to the conduit connectors 54 of the terminal assembly 19 at the opposite end of the cable, whereby water may flow from the supply conduits 55 through the cable, leaving the same through the outlet conduits 56.

As shown in FIGURE 5, the space inside the inner flexible conduit 18 is in communication with the space between the inner conduit 18 and the outer conduit 17 by the provision of the apertures 52 in the core members 21, so that cooling liquid may flow freely around both the current-carrying stranded wire elements 50 and the current-carrying stranded wire elements 26. The stranded wire elements are insulated from each other, however, by the flexible insulating conduit 18.

In operation, current flows through the respective sets of stranded wire conductors 26 and 50, and simultaneously, cooling liquid flows past the conductors, removing heat therefrom and maintaining the conductors at a safe temperature. Thus, the cable may carry heavy current safely and without excessive temperature rise during the required operations of the associated welding machine, or other heavy-current apparatus with which the cable is employed.

While a specific embodiment of an improved water-cooled cable device for use with spot-welding machines or similar heavy-current apparatus has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A liquid-cooled conductor assembly comprising a pair of terminal assemblies, each terminal assembly comprising an outer metal shell having an apertured end lug, an inner tubular metal core mounted axially in and spaced from said outer shell and having an end portion extending substantially parallel to said end lug, a plurality of longitudinally spaced spacer rings of insulating resilient material disposed between the tubular core and the outer shell, a recessed terminal plate receiving and clampingly engaging said end portion, insulation means between said terminal plate and end lug, and means clampingly securing said terminal plate to said insulation means, a first flexible conduit of insulating material secured on and extending between the inner end portions of the inner cores, first flexible conductor means in said conduit connecting said core inner end portions, second flexible conductor means secured on and connecting the inner portions of the outer metal shells and disposed externally adjacent the first flexible conduit, a second flexible conduit secured on and extending between the outer metal shells and surrounding said second flexible conductor means, and respective liquid inlet and outlet conduits connected to the outer metal shells for circulating cooling liquid through the conductor assembly, the tubular metal cores being apertured to establish free communication between the interior of the first flexible conduit and the space between the flexible conduits.

2. A liquid-cooled conductor assembly comprising a pair of terminal assemblies, each terminal assembly comprising an outer metal shell having an apertured end lug, an inner tubular metal core mounted axially in and spaced from said outer shell and having an end portion extending substantially parallel to said end lug, a plurality of longitudinally spaced spacer rings of insulating resilient material disposed between the tubular core and the outer shell, a recessed terminal plate receiving and clampingly engaging said end portion, insulation means between said terminal plate and end lug, and means clampingly securing said terminal plate to said insulation means, a first flexible conduit of insulating material secured on and extending between the inner end portions of the inner cores, a plurality of first flexible conductors in said conduit wound helically around each other and connecting said core inner end portions, a plurality of second flexible conductors wound helically around said first-named conduit and connecting the inner end portions of the outer metal shells, a second flexible conduit secured on and extending between the outer metal shells and surrounding said second-named flexible conductors, and respective liquid inlet and outlet conduits connected to the outer metal shells for circulating cooling liquid through the conductor assembly, the tubular metal cores being formed with a plurality of apertures distributed along their lengths to establish free communication between the interior of the first flexible conduit and the space between the flexible conduits.

3. In a liquid-cooled conductor assembly, a terminal assembly comprising an outer metal shell having an apertured end lug, an inner tubular metal core mounted axially in and spaced from said outer shell and having an end portion extending substantially parallel to said end lug, a plurality of longitudinally spaced spacer rings of insulating resilient material disposed between the tubular core and the outer shell, a recessed terminal plate receiving and clampingly engaging said end portion, insulation means between said terminal plate and said end lug, and means clampingly securing said terminal plate to said insulation means, said inner tubular metal core being formed with a plurality of apertures distributed along its length to provide free communication between its interior and the space between the outer shell and said core.

4. In a terminal construction for electrical cables, an inner metal core of tubular shape, an outer metal shell of tubular shape coaxially surrounding said core in spaced relation therewith, annular insulative means between said shell and core, the shell, core and insulative means being so shaped as to permit separation of the shell and core in at least one axial direction, recessed cable-attaching portions at one end of said core and of said shell, apertured terminal lug portions at the other end of said core and of said shell, coaxial spaced inner and outer insulative sleeves secured to the first-mentioned ends respectively of said core and shell, coolant passages formed in said core and shell for conducting coolant into the space within said inner sleeve and the annular space between said sleeves, the insulative means between said core and shell comprising a pair of axially spaced seals forming an annular space therebetween, said coolant passages including a conduit fitting in said shell leading to said last-mentioned space, an axial passage in said core leading to the space within said inner sleeve, and radial passages in said core leading from said last-mentioned axial passage to the space between said sleeves and the space between said seals.

5. A terminal and cable construction for an electrical conductor assembly, comprising an outer shell, a pair of conductors which include a plurality of inner conductor strands secured to one end of an inner tubular metal core positioned within and coaxial with said shell, a flexible insulative sleeve surrounding said inner conductor strands and secured to said one end of said core, insulative means within said shell supporting said core in spaced relation with said shell, the conductors further including a plurality of outer conductor strands secured to one end of said shell and surrounding said insulating sleeve, an outer flexible sleeve surrounding said outer conductor strands and secured to said shell, the insulative means being annular, the shell having an outer annular surface which is no larger than the inner surface of said outer sleeve, the shell, core, and insulative means being shaped to permit separation of the shell and core in at least one axial direction, recessed cable-attaching portions provided at one end of said core and of said shell, and apertured terminal lug portions provided at the other end of said core and of said shell, said last-mentioned portions comprising axially extending surfaces on said core and shell which are disposed within an imaginary extension of the outer shell surface, and radially extending apertures in said surfaces adapted to receive fastener means for the terminal lugs, whereby axially extending surfaces on the latter may be clamped in firm electrical contact with the shell and core.

References Cited by the Examiner

UNITED STATES PATENTS

| | | | |
|---|---|---|---|
| 297,177 | 4/1884 | Shelbourne | 174—34 |
| 2,320,470 | 6/1943 | Rees | 174—15 |
| 2,835,721 | 5/1958 | Leathers | 174—19 X |
| 3,022,368 | 2/1962 | Miller | 174—15 |

JOHN F. BURNS, *Primary Examiner.*

DARRELL L. CLAY, *Examiner.*